(12) United States Patent
Li et al.

(10) Patent No.: US 7,768,988 B2
(45) Date of Patent: Aug. 3, 2010

(54) METHOD AND APPARATUS TO PERFORM NETWORK MEDIUM RESERVATION IN A WIRELESS NETWORK

(75) Inventors: Qinghua Li, Sunnyvale, CA (US); Adrian P. Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 989 days.

(21) Appl. No.: 11/062,539

(22) Filed: Feb. 22, 2005

(65) Prior Publication Data

US 2006/0187964 A1   Aug. 24, 2006

(51) Int. Cl.
  *H04J 3/00* (2006.01)
(52) U.S. Cl. ...................................... 370/345
(58) Field of Classification Search ................. 370/345, 370/474, 473, 476; 709/228, 232–235
See application file for complete search history.

(56) References Cited

U.S. PATENT DOCUMENTS

| | | | | |
|---|---|---|---|---|
| 6,141,336 | A * | 10/2000 | Bauchot et al. | 370/348 |
| 7,248,600 | B2 * | 7/2007 | Benveniste | 370/445 |
| 7,272,156 | B2 * | 9/2007 | Shoemake et al. | 370/469 |
| 7,290,195 | B2 * | 10/2007 | Guo et al. | 714/749 |
| 7,519,030 | B2 * | 4/2009 | Cimini et al. | 370/338 |
| 7,542,453 | B2 * | 6/2009 | Morioka et al. | 370/338 |
| 2002/0087923 | A1 * | 7/2002 | Eroz et al. | 714/702 |
| 2002/0163933 | A1 | 11/2002 | Benveniste | |
| 2002/0172186 | A1 * | 11/2002 | Larsson | 370/349 |
| 2003/0152058 | A1 * | 8/2003 | Cimini et al. | 370/338 |

(Continued)

FOREIGN PATENT DOCUMENTS

EP  1315335 A1  5/2003

(Continued)

OTHER PUBLICATIONS

IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 8: Medium Access Control (MAC) Quality of Service Enhancements, 802.11e-2005, pp. 74.*

(Continued)

*Primary Examiner*—Dmitry H Levitan
(74) *Attorney, Agent, or Firm*—Thorpe North & Western LLP (57) ABSTRACT

Techniques and structures are provided to support a short-NAV type wireless medium reservation scheme in a network that utilizes adaptive modulation techniques. The conventional long-NAV medium reservation technique uses a medium reservation period that reserves a wireless medium until the end of a present frame exchange. The short-NAV medium reservation technique, on the other hand, uses a medium reservation period that reserves the wireless medium until the end of the next transmission of the other communicating node involved in a frame exchange. In some embodiments, a short-NAV technique is provided where a medium reservation period is determined based upon a suggested data rate. If a device decides not to use the suggested data rate, the device may utilize packet fragmentation techniques to ensure that a subsequent data transmission does not exceed the specified medium reservation period.

18 Claims, 6 Drawing Sheets

U.S. PATENT DOCUMENTS

| | | | |
|---|---|---|---|
| 2003/0227893 A1* | 12/2003 | Bajic | 370/338 |
| 2003/0231650 A1* | 12/2003 | Shoemake et al. | 370/464 |
| 2003/0231715 A1* | 12/2003 | Shoemake et al. | 375/267 |
| 2004/0120411 A1* | 6/2004 | Walton et al. | 375/260 |
| 2004/0233878 A1* | 11/2004 | Liu et al. | 370/338 |
| 2004/0242159 A1* | 12/2004 | Calderon et al. | 455/63.3 |
| 2005/0018638 A1* | 1/2005 | Lindskog et al. | 370/338 |
| 2005/0021864 A1* | 1/2005 | Sherman et al. | 709/247 |
| 2005/0053037 A1* | 3/2005 | Ginzburg et al. | 370/333 |
| 2005/0068916 A1* | 3/2005 | Jacobsen et al. | 370/328 |
| 2005/0135318 A1* | 6/2005 | Walton et al. | 370/338 |
| 2005/0152280 A1* | 7/2005 | Pollin et al. | 370/252 |
| 2005/0153735 A1* | 7/2005 | Morioka et al. | 455/553.1 |
| 2005/0169232 A1* | 8/2005 | Sakoda et al. | 370/347 |
| 2005/0204247 A1* | 9/2005 | Guo et al. | 714/746 |
| 2005/0226273 A1* | 10/2005 | Qian | 370/474 |
| 2005/0249151 A1* | 11/2005 | Takano | 370/328 |
| 2005/0249244 A1* | 11/2005 | McNamara et al. | 370/474 |
| 2006/0019610 A1* | 1/2006 | Ue et al. | 455/69 |
| 2006/0056443 A1* | 3/2006 | Tao et al. | 370/462 |
| 2006/0187964 A1* | 8/2006 | Li et al. | 370/474 |
| 2006/0245384 A1 | 11/2006 | Talukdar et al. | |
| 2007/0140291 A1* | 6/2007 | Li | 370/463 |
| 2007/0291639 A1* | 12/2007 | Jacobsen et al. | 370/208 |
| 2008/0107156 A1* | 5/2008 | Wentick et al. | 375/134 |

FOREIGN PATENT DOCUMENTS

| | | |
|---|---|---|
| WO | WO-2006035070 A1 | 4/2006 |
| WO | WO-2006091340 A2 | 8/2006 |
| WO | WO-2006091340 A3 | 8/2006 |

OTHER PUBLICATIONS

U.S. Appl. No. 60/536,071, filed Jan. 12, 2004, Rajamani, Krishnan, et al.

* cited by examiner

```
                    ┌──────────────────────────────┐
                    │  RECEIVE A WIRELESS FRAME FROM│─ 122
                    │  A REMOTE WIRELESS ENTITY, THE│
                    │  WIRELESS FRAME HAVING AN    │
                    │  ASSOCIATED MEDIUM           │
                    │  RESERVATION PERIOD          │
                    └──────────────┬───────────────┘
                                   ▼
                    ┌──────────────────────────────┐
                    │ DETERMINE AN ACTUAL DATA RATE│─ 124
                    │ TO USE TO TRANSMIT DATA TO THE│
                    │ REMOTE WIRELESS ENTITY       │
                    └──────────────┬───────────────┘
                                   ▼
                    ┌──────────────────────────────┐
                    │ WHEN THE ACTUAL DATA RATE DOES│─ 126
                    │ NOT ALLOW AN ENTIRE DATA MPDU│
                    │ TO BE TRANSMITTED WITHIN THE │
                    │ MEDIUM RESERVATION PERIOD,   │
                    │ FRAGMENT A DATA MPDU TO      │
                    │ GENERATE A FIRST FRAGMENT THAT│
                    │ CAN BE TRANSMITTED WITHIN THE│
                    │ MEDIUM RESERVATION PERIOD    │
                    └──────────────────────────────┘
```

METHOD AND APPARATUS TO PERFORM NETWORK MEDIUM RESERVATION IN A WIRELESS NETWORK

TECHNICAL FIELD

The invention relates generally to wireless communication and, more particularly, to wireless networking.

BACKGROUND OF THE INVENTION

In many wireless networks, a wireless medium may be shared by many different nodes or devices within the network. When multiple nodes transmit on a wireless medium at the same time, collisions may occur that corrupt the corresponding communication. One method for avoiding collisions involves the use of carrier sensing. That is, before transmitting on the wireless medium, a node first senses the medium to determine whether another node is currently transmitting. If another node is transmitting, the first node must wait for a period of time and then try again. If no other node is transmitting, the first node may then proceed with its transmission. While effective, use of such a technique can lead to other problems such as, for example, the hidden node problem. The hidden node problem may occur when there are at least three nodes in the wireless network: node A, node B, and node C. Node B is within range of both node A and node C, but node A and node C are out of range of each other. When node A wishes to transmit to node B, it first senses the wireless network medium and, if no traffic is detected, it initiates its transmission. However, because node C is out of range of node A, it is unable to detect the transmissions of node A. Thus, node C may begin to transmit while node A is transmitting to node B, resulting in a collision that interferes with the communication.

To overcome the hidden node problem, the IEEE 802.11 standard provides a handshaking protocol that allows both node A and node B to reserve the wireless medium for a predetermined amount of time before node A is permitted to transmit user data. When node A wishes to transmit to node B, it first transmits a request-to-send (RTS) frame to node B that indicates the desire to transmit data. The RTS frame also includes a network allocation vector (NAV) that indicates a time period during which the wireless medium is to be reserved. Nodes that receive the RTS frame then record the NAV and refrain from transmitting for the corresponding period. When node B receives the RTS frame, it responds by transmitting a clear-to-send (CTS) frame back to node A that indicates that it is okay to begin transmission. The CTS frame also includes a NAV that reserves the same time period. Because node C is within range of node B, node C receives the CTS frame, reads the NAV, and refrains from transmitting for the indicated period, thus preventing a collision. After node A receives the CTS frame from node B, it may initiate the transmission of user data to node B. After the data has been fully received, node B may transmit an acknowledgement (ACK) frame to node A to indicate that the data has been successfully received.

In the past, the NAVs transmitted by the initiating node and the responding node reserved the wireless medium until the end of the corresponding frame exchange. For example, in the frame exchange described above that includes an RTS frame, a CTS frame, a data frame, and an ACK frame, the NAVs transmitted within both the RTS frame and the CTS frame would protect until the end of the ACK frame. This type of medium reservation technique will be referred to herein as the "long NAV" technique. A problem that arises with long NAV is that, if the initial handshake is unsuccessful, then the medium is still reserved for the entire frame exchange period, even though no data communication will take place, thereby wasting available resources. To deal with this problem, a technique has been proposed that uses NAVs that only reserve the wireless medium until the end of the next transmission of the other communicating node involved in the frame exchange. This type of medium reservation technique will be referred to herein as the "short NAV" technique. The present invention relates to techniques and structures for implementing short NAV type medium reservation in networks that utilize adaptive modulation.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
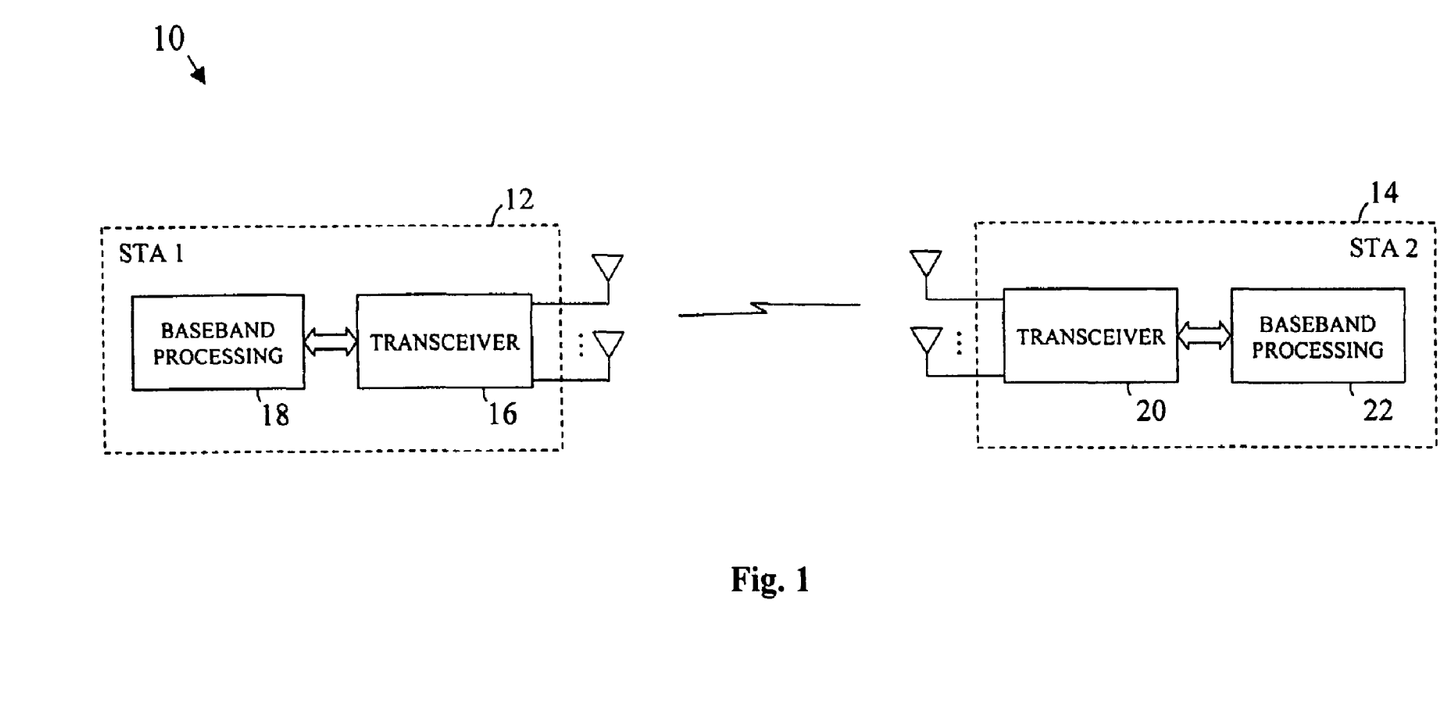
FIG. 1 is a block diagram illustrating an example wireless network arrangement in accordance with an embodiment of the present invention.

FIG. 1 is a block diagram illustrating an example wireless network arrangement 10 in accordance with an embodiment of the present invention. As illustrated, a first wireless device 12 (STA 1) is communicating with a second wireless device 14 (STA 2) via a wireless communication link. As will be appreciated, other wireless devices (e.g., STAs and/or APs) may be operative in a vicinity around the first and second wireless devices 12, 14. When the first wireless device 12 wishes to transmit user data to the second wireless device 14, the first wireless device 12 may initiate a frame exchange sequence with the second wireless device 14. In such a scenario, the first wireless device 12 may be referred to as the "initiator" of the frame exchange and the second wireless device 14 may be referred to as the "responder." As will be described in greater detail, the frame exchange sequences that occur between the first and second wireless devices 12, 14 may utilize a short NAV approach for reserving the wireless network medium during the exchange.

The first and second wireless devices 12, 14 may also have adaptive modulation capabilities. That is, the devices may be able to adapt the modulation coding scheme being used to the current conditions of the wireless channel between the devices. Thus, when channel conditions are favorable (e.g., received signal to noise ratios (SNRs) are relatively high), a modulation coding scheme (MCS) may be used that codes a higher number of bits per symbol (e.g., 64 quadrature amplitude modulation (QAM)) and/or employs a higher FEC code rate (e.g., ⅞). Conversely, when channel conditions are unfavorable (e.g., received SNRs are relatively low), an MCS may be used that codes a lower number of bits per symbol (e.g., binary phase shift keying (BPSK)) and/or employs a lower code rate (e.g., ½), and so on. In general, the lower the code rate and the modulation level, the better the protection to the information bits. If there aren't enough information bits (or data) available to fill an allocated physical layer slot (or OFDM symbol), the MCS being used can be lowered to achieve better overall protection (e.g., lower packet error rate). For example, in the OFDM physical layer of the IEEE 802.11 standard, a time slot is assigned in 4 microseconds (µS). If there are not enough information bits to fill up the last OFDM symbol, a lower MCS may be employed to get better protection.

With reference to FIG. 1, the first wireless device 12 may include, among other things, a wireless transceiver 16 (e.g., a radio frequency (RF) transceiver) and a baseband processing subsystem 18. The wireless transceiver 16 is operative for supporting wireless communication with one or more remote wireless entities. As shown, the wireless transceiver 16 may be coupled to one or more antennas to facilitate the transmission and reception of wireless signals. Any type of antenna(s) may be used including, for example, a dipole, a patch, a helical antenna, and/or others. The baseband processing subsystem 18 is operative for performing baseband processing of signals received by, and to be transmitted from, the wireless transceiver 16. The baseband processing subsystem 18 may also perform some or all of the control functions of the first wireless device 12. The baseband processing subsystem 18 may include one or more programmable/reconfigurable digital processing devices such as, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others. Other digital circuitry may also, or alternatively, be present within the baseband processing subsystem 18. The second wireless device 14 may also include a wireless transceiver 20 and a baseband processing subsystem 22, which operate in a similar manner to those of the first wireless device 12. As depicted in FIG. 1, the first and second wireless devices are both wireless stations (STAs). It should be appreciated that features of the invention may also be utilized for communication links between a station and a wireless access point (AP) or base station, between two wireless APs or base stations, and/or in other arrangements. In at least embodiment, the first and second wireless devices 12, 14 are configured to perform multiple input/multiple output (MIMO) based wireless communication. Non-MIMO implementations also exist.

Figure 2:
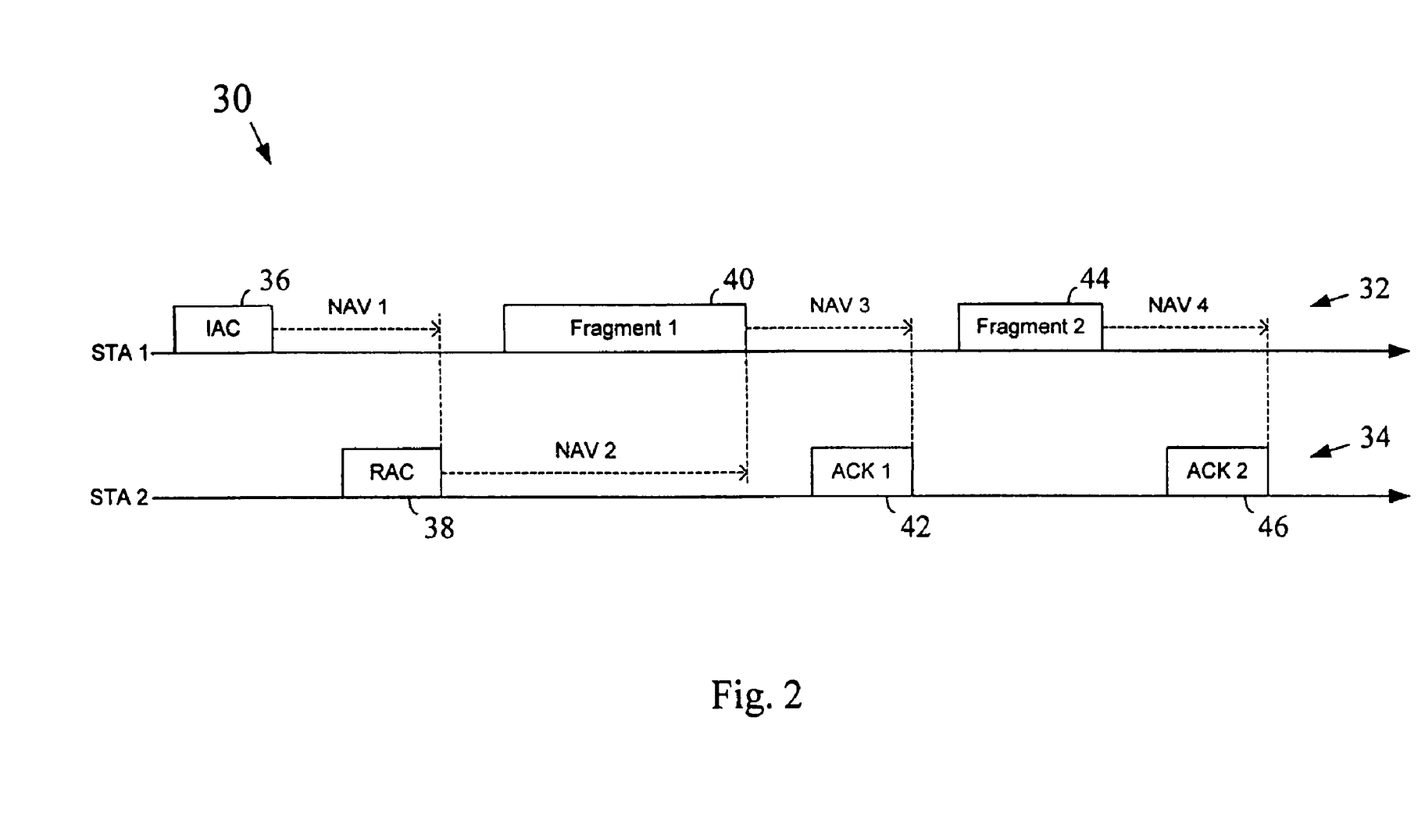
FIG. 2 is a diagram illustrating an example frame exchange sequence within a wireless network in accordance with an embodiment of the present invention.

FIG. 2 is a diagram illustrating an example frame exchange sequence 30 within a wireless network in accordance with an embodiment of the present invention. As depicted, the frame exchange sequence 30 is intended to transfer a single MAC protocol data unit (MPDU) from an initiator device to a responder device. An MPDU is a unit of data that may be exchanged between two peer devices within a network following the IEEE 802.11 wireless networking standard and its progeny. The frame exchange sequence 30 may occur between any two network devices (e.g., first and second wireless devices 12, 14 of FIG. 1, etc.). The upper portion 32 of FIG. 2 illustrates the transmissions of the initiator device (e.g., STA 1) during the frame exchange sequence 30 and the lower portion 34 illustrates the transmissions of the responder device (e.g., STA 2). As shown, the initiator device begins the frame exchange sequence 30 by transmitting an initiator aggregate control (IAC) frame 36 to the responder device. Among other things, the IAC frame 36 may include training information to be used by the responder device to develop channel state information for the wireless channel. The IAC frame 36 may also include a first network allocation vector (NAV 1) to reserve the wireless network medium until the end of the subsequent transmission of the responder device (i.e., short NAV). Other wireless network devices in the vicinity of the initiator device may receive the IAC frame 36 and then refrain from transmitting for the indicated period. The IAC frame 36 may also include a modulation and coding scheme (MCS) measurement request that requests that the responder device determine an MCS for the initiator to use to transmit user data to the responder. Also, the IAC frame 36 may include a length field to indicate the amount of data that the initiator desires to transmit within the next MPDU to be transmitted by the initiator. Other information, requests, and/or instructions may also be included within the IAC frame 36.

After successfully receiving the IAC frame 36, the responder device uses the training information within the frame 36 to generate channel state information for the wireless channel. The responder device will then transmit a responder aggregate control (RAC) frame 38 to the initiator device that includes the channel information. The responder device will typically wait a predetermined amount of time to transmit the RAC frame 38 (e.g., a short inter frame space (SIFS) in a network following an IEEE 802.11 based wireless standard, etc.). In addition to channel information, the RAC frame 38 may include a second NAV (i.e., NAV 2) to reserve the wireless network medium until the end of a subsequent transmission of the initiator device. In order to determine the amount of time necessary to reserve the network medium, the responder device needs to know what the duration of the subsequent transmission of the initiator device will be. The responder will typically know the duration of the overhead portions of the subsequent transmission of the initiator. The responder may also know the amount of user data to be transmitted in the subsequent transmission of the initiator (e.g., from the length field of the IAC frame 36). However, because adaptive modulation is being used, the data rate of the user data may be unknown at this point. In order to generate the second NAV, therefore, the responder device needs to determine what data rate will be used by the initiator to transmit user data to the responder in the subsequent transmission.

In a wireless device that utilizes adaptive modulation, the transmission power of a higher order constellation (e.g., 64 QAM) will typically be less than the transmission power of a lower order constellation (e.g., BPSK). This is because a higher order constellation typically requires more linear power amplifier operation than a lower order constellation. This effect is known as power amplifier (PA) power back off. Because of PA power back off, an initiator device may be able to transmit an IAC frame at a higher power level than the corresponding data will be transmitted. For this reason, the responder device will not be able to predict the exact data rate (or MCS) that will be used to transmit data from the initiator to the responder based on only the receive power of the IAC frame and the channel information. In at least one embodiment of the present invention, the responder will generate a suggested data rate/MCS to be used by the initiator and will generate a corresponding NAV based on the suggested data rate. The initiator may then treat the suggested data rate as a recommendation, but is not required to use the suggested rate. If the initiator does not use the suggested rate, it must still ensure that its subsequent signal transmission occurs within the time period defined by the generated NAV. This may be achieved using MPDU fragmentation. To generate the suggested data rate/MCS, the responder may use the channel information it generates using training data from the IAC frame 36 and knowledge of the power amplifier power back-off characteristics of the transmitter within the initiator device (e.g., a stored power amplifier power back off table of empirically derived values, etc.). The responder may include an indication of the suggested data rate/MCS within the RAC frame 38 to be read by the initiator device.

Upon receipt of the RAC frame 38, the initiator may read the suggested data rate. The initiator is not required, however, to use the suggested data rate. That is, the initiator may then determine an optimal data rate to use based on, for example, the channel information and its own knowledge of the PA power back off characteristics. The subsequent transmission will still have to take place within the time period defined by NAV 2. If the initiator device selects a data rate that is the same as or higher than the suggested data rate, then the entire MPDU to be transmitted to the responder device during the wireless frame exchange may be delivered within the next frame transmitted by the initiator. If the initiator device selects a data rate that is lower than the suggested data rate, on the other hand, then it is not possible to transmit all of the MPDU to the responder device during the subsequent transmit frame of the initiator device. In such a case, fragmentation is used to divide the data amongst two or more transmit frames of the initiator device.

With reference to FIG. 2, when a data rate is selected by the initiator that is less than the suggested data rate, a first fragment 40 (Fragment 1) may be transmitted within a frame, after the RAC frame 38, that includes an amount of user data that is selected to fill the time period defined by NAV 2 at the selected data rate (i.e., using the selected MCS). As shown, the first fragment 40 may include a third NAV (NAV 3) to reserve the wireless network medium until the end of a subsequent transmission of the responder device (i.e., first acknowledgement frame 42 (ACK 1)). The remainder of the data may then be included within a second fragment 44 (Fragment 2) after the first acknowledgement frame 42. The second fragment 44 may include a fourth NAV (NAV 4) to reserve the wireless network medium until the end of a subsequent transmission of the responder device (i.e., second acknowledgement frame 46 (ACK 2)).

In at least one embodiment of the invention, the first fragment 40 may include, in a header portion thereof, an indication of the actual data rate (or the modulation coding scheme) that was used for the user data within the fragment 40. The first fragment 40 may also (or alternatively) include an indication that an additional fragment is to be transmitted and/or an indication of the amount of data that will be transmitted within a subsequent transmission of the initiator (e.g., a length field) and/or an indication of the amount of data that is left to transmit within the frame exchange 30. If more than two fragments are transmitted by the initiator within a frame exchange, each fragment other than the last fragment may include the above information.

In the embodiment of FIG. 2, the first acknowledgement frame 42 does not include a NAV. Instead, the initiator device transmits the second fragment 44 a predetermined amount of time (e.g., a SIFS) after the end of the first acknowledgement frame 42. In other embodiments, the first acknowledgement frame 42 may include a NAV to reserve the network medium until the end of the second fragment 44. To calculate this NAV value, the responder device may assume that the same data rate will be used for the second fragment 44 that was used to transmit data within the first fragment 40. The responder may thus multiply the amount of data still to be transmitted by the previously used data rate during calculation of the NAV. In another approach, the responder may calculate a new suggested data rate for use by the initiator based on updated channel information. The new suggested data rate may then be used to generate the new NAV to be included in the first ACK frame 42. The initiator would then be able to use the new suggested data rate or calculate a different data rate to use for the second fragment 44. If a data rate is used that is less than the suggested data rate, additional fragmentation may be necessary (i.e., a third fragment, etc.).

Figure 3:
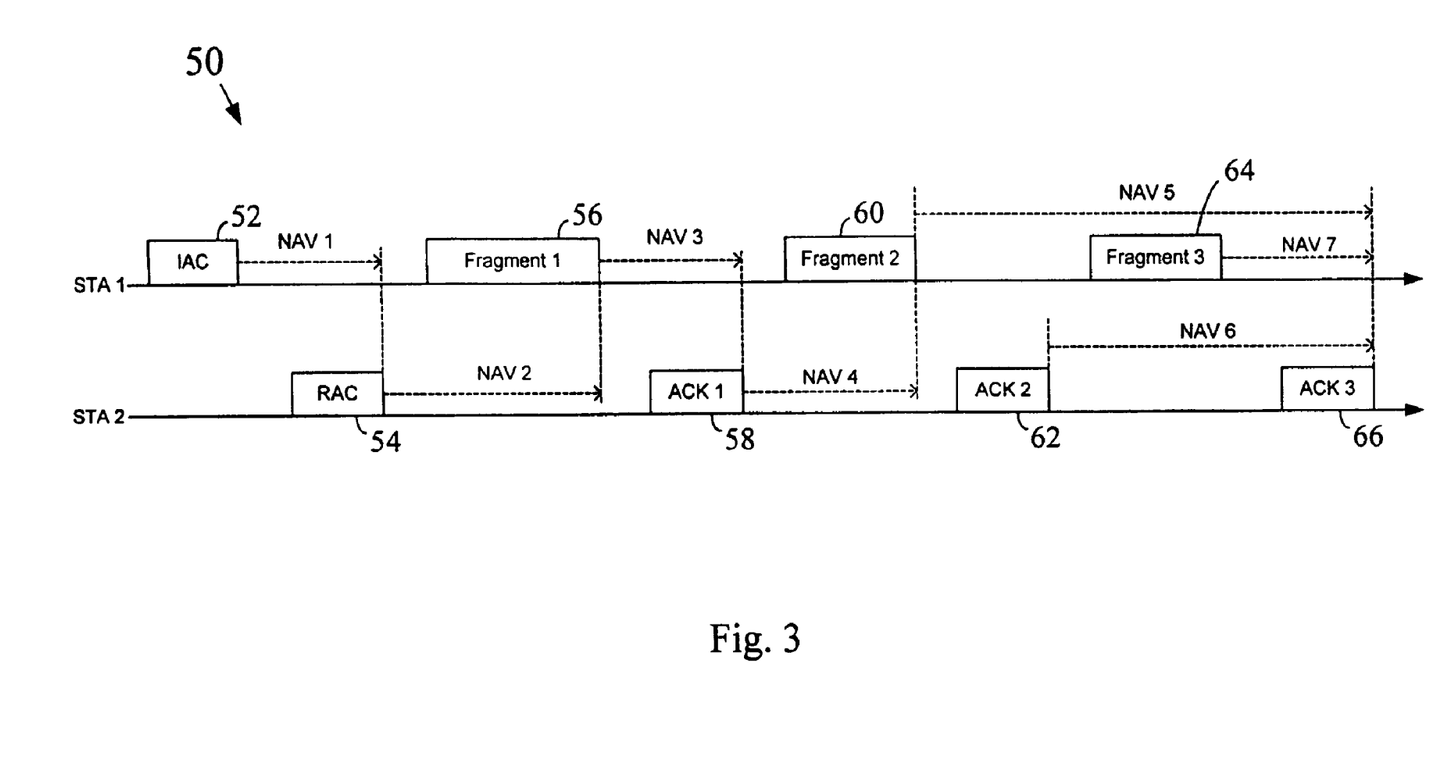
FIG. 3 is a diagram illustrating an example frame exchange sequence in a wireless network in accordance with another embodiment of the present invention.

FIG. 3 is a diagram illustrating an example frame exchange sequence 50 in accordance with another embodiment of the present invention. As before, an IAC frame 52 is first transmitted by an initiator device to start the sequence 50. A responder device then transmits an RAC frame 54 that may include a suggested data rate/MCS for use by the initiator to transmit user data to the responder. After receiving the RAC frame 54, the initiator may decide not to use the suggested data rate. If the initiator selects a data rate that is slower than the suggested data rate, the initiator will only transmit a fragment 56 of the data (Fragment 1) within its next transmission.

After the first fragment 56 has been received, the responder will transmit a first acknowledgement frame 58 (ACK 1) to the initiator to acknowledge the receipt. After the initiator receives the first acknowledgement frame 58, the initiator may determine that the optimal mode has been found for the link between the initiator and the responder. The initiator may then change to a conventional long NAV mechanism to reserve the wireless medium for the remainder of the frame exchange. As shown in FIG. 3, the second fragment 60 (Fragment 2) includes a NAV (NAV 5) that defines a medium reservation period that lasts until the end of the frame exchange 50. After the second fragment 60 has been received by the responder, the responder may transmit a second ACK frame 62 to the initiator to acknowledge the receipt. The second ACK frame 62 may include a sixth NAV (NAV 6) that also extends until the end of the frame exchange 50. Each subsequent fragment (e.g., third fragment 64, etc.) may also include a NAV that defines a period to the end of the frame exchange 50. In FIG. 3, because the third fragment 64 is the final fragment to be transmitted during the frame exchange sequence 50, the third ACK frame 66 (ACK 3) does not include a NAV.

In the description above, reservations of the wireless network medium are carried out using a NAV value within the MAC frames transmitted by the network devices. It should be appreciated that other short NAV type medium reservation techniques may also be used in accordance with the present invention. For example, network medium reservations may be carried out using the physical layer (PHY) header associated with a transmission (e.g., spoofing). In at least one embodiment, network medium reservation is carried out in both the MAC layer and the PHY layer.

Figure 4:
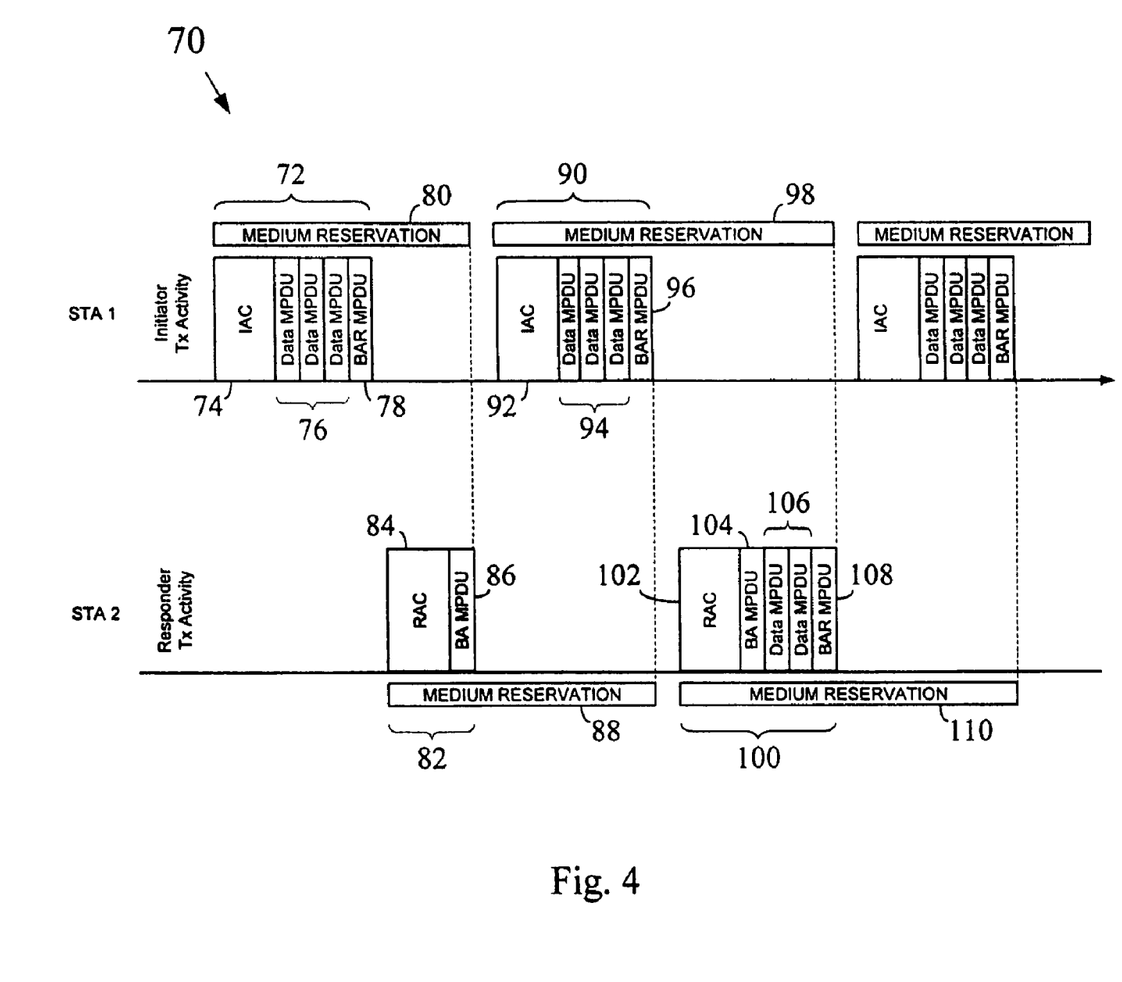
FIG. 4 is a diagram illustrating an example frame exchange sequence in a wireless network in accordance with still another embodiment of the present invention.

FIG. 4 is a diagram illustrating an example frame exchange sequence 70 in accordance with another embodiment of the present invention. The frame exchange sequence 70 uses aggregation of MPDUs to fill the medium reservation periods determined for the various frames. Fragmentation of MPDUs may also be used to efficiently fill the medium reservation periods. The medium reservation periods may be defined at the MAC layer using NAVs and/or at the PHY layer using spoofing. As illustrated, an initiator device initially transmits a first frame 72 that includes an IAC 74, a number of aggregated data MPDUs 76, and a block acknowledgement request (BAR) MPDU 78. The first frame 72 has a first medium reservation period 80 associated with it to reserve the wireless medium until the end of the subsequent transmission of the responder. After receiving the first frame 72, the responder estimates the channel using training information within the IAC 74 and determines a suggested data rate (and/or MCS) based on the channel estimation. The responder then transmits a second frame 82 that includes an RAC 84 and a block acknowledgement (BA) MPDU 86. The second frame 82 has a second medium reservation period 88 associated with it to reserve the wireless medium until the end of the subsequent transmission of the initiator. The RAC 84 may include, for example, the channel information, the suggested data rate/MCS for the initiator to use for user data within a subsequent transmission, and/or other information.

As before, the initiator is not required to use the data rate/MCS suggested by the responder. After receiving the second frame 82, the initiator may select an optimal data rate (or MCS) based on, for example, its PA power backoff and the received channel information. The initiator then transmits a third frame 90 to the responder that may include an IAC 92, a number of aggregated data MPDUs 94, and a BAR MPDU 96. The number of data MPDUs 94 within the third frame 90 is selected so that the third frame 90 efficiently fills the second medium reservation period 88 at the data rate selected for use by the initiator. In at least one embodiment, one or more of the data MPDUs 94 may be fragmented in order to appropriately fill the second medium reservation period 88 (although in other embodiments fragmentation is not used and an integer number of MPDUs are aggregated). If fragmentation is used, the remainder of the fragmented MPDU may be transmitted within the next transmit frame of the initiator. The third frame 90 has a third medium reservation period 98 associated with it to reserve the wireless medium until the end of the subsequent transmission of the responder. The IAC 92 of the third frame 90 may include, for example, an indication of the data rate/MCS that was actually used for the user data within the frame 90. The IAC 92 of the third frame 90 may also include a suggested data rate/MCS to be used by the responder to transmit any reverse direction data that may need to be transmitted (if reverse direction data flow is supported).

After receiving the third frame 90, the responder may transmit a fourth frame 100 that includes: a RAC 102, a BA MPDU 104, a number of aggregated reverse direction data MPDUs 106, and a BAR MPDU 108. As in the forward direction, the number of data MPDUs 106 within the fourth frame 100 is selected so that the fourth frame 100 efficiently fills the third medium reservation period 98. The responder is not required to use the data rate/MCS suggested by the initiator for the reverse direction data. Fragmentation of data MPDUs may also be performed for the reverse direction data. Any undelivered fragments may be transmitted within a subsequent transmit frame of the responder.

Figure 5:
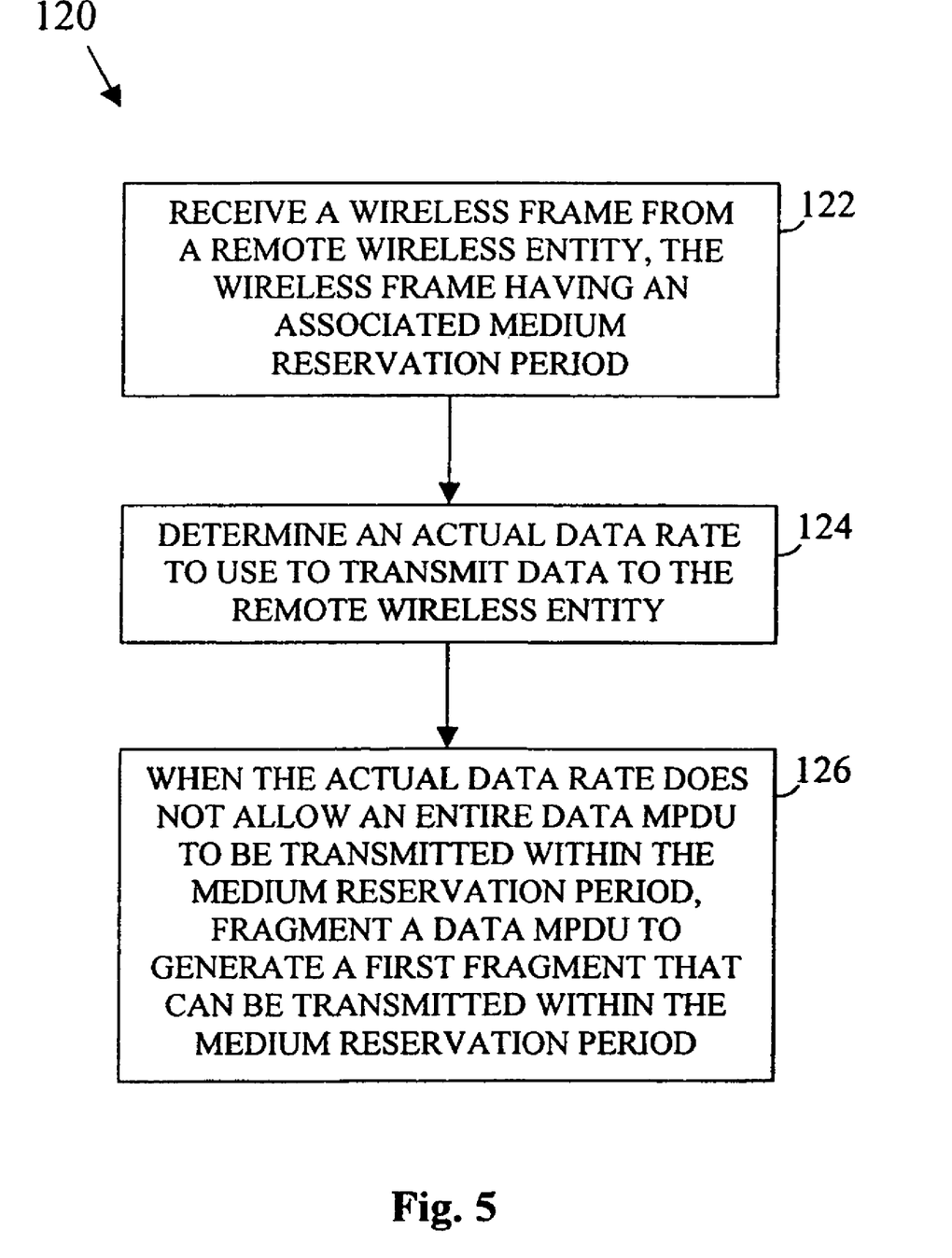
FIG. 5 is a flowchart illustrating an example method for use during a frame exchange in a wireless network implementing short NAV in accordance with an embodiment of the present invention.

FIG. 5 is a flowchart illustrating an example method 120 for use during a frame exchange in a wireless network implementing short NAV in accordance with an embodiment of the present invention. The method 120 may be used to transmit a single data MPDU from a wireless device to a remote wireless entity. In at least one embodiment of the invention, the method 120 may be implemented within a baseband processing portion of a wireless network device (e.g., baseband processing subsystem 18 of wireless device 12 in FIG. 1). A wireless frame is first received from the remote wireless entity (block 122). The wireless frame may be, for example, an RAC frame from a remote responder device that was transmitted in response to an IAC frame (see, for example, FIG. 2). The wireless frame may include a suggested data rate (or MCS) to be used to transmit data to the remote wireless entity in a subsequent transmission. The wireless frame may also have a medium reservation period associated with it (e.g., a short NAV or spoofed PLCP length) within which a subsequent transmission to the remote wireless entity is to take place. An actual data rate is then determined that will be used to transmit user data within the subsequent transmission to the remote wireless entity (block 124). The actual data rate may be different from the suggested data rate identified within the wireless frame (if any). When the actual data rate does not allow the entire data MPDU to be transmitted within the next transmission of the wireless device (i.e., within the medium reservation period), the MPDU to be transferred is fragmented, with a first fragment to be transmitted within the subsequent data frame (block 126). The remainder of the MPDU may then be transmitted in one or more later data frames. An ACK frame may be transmitted from the remote wireless entity to the wireless device after each fragment is received. In a system that allows reverse direction data flow, a similar technique may be used in the reverse direction.

Figure 6:
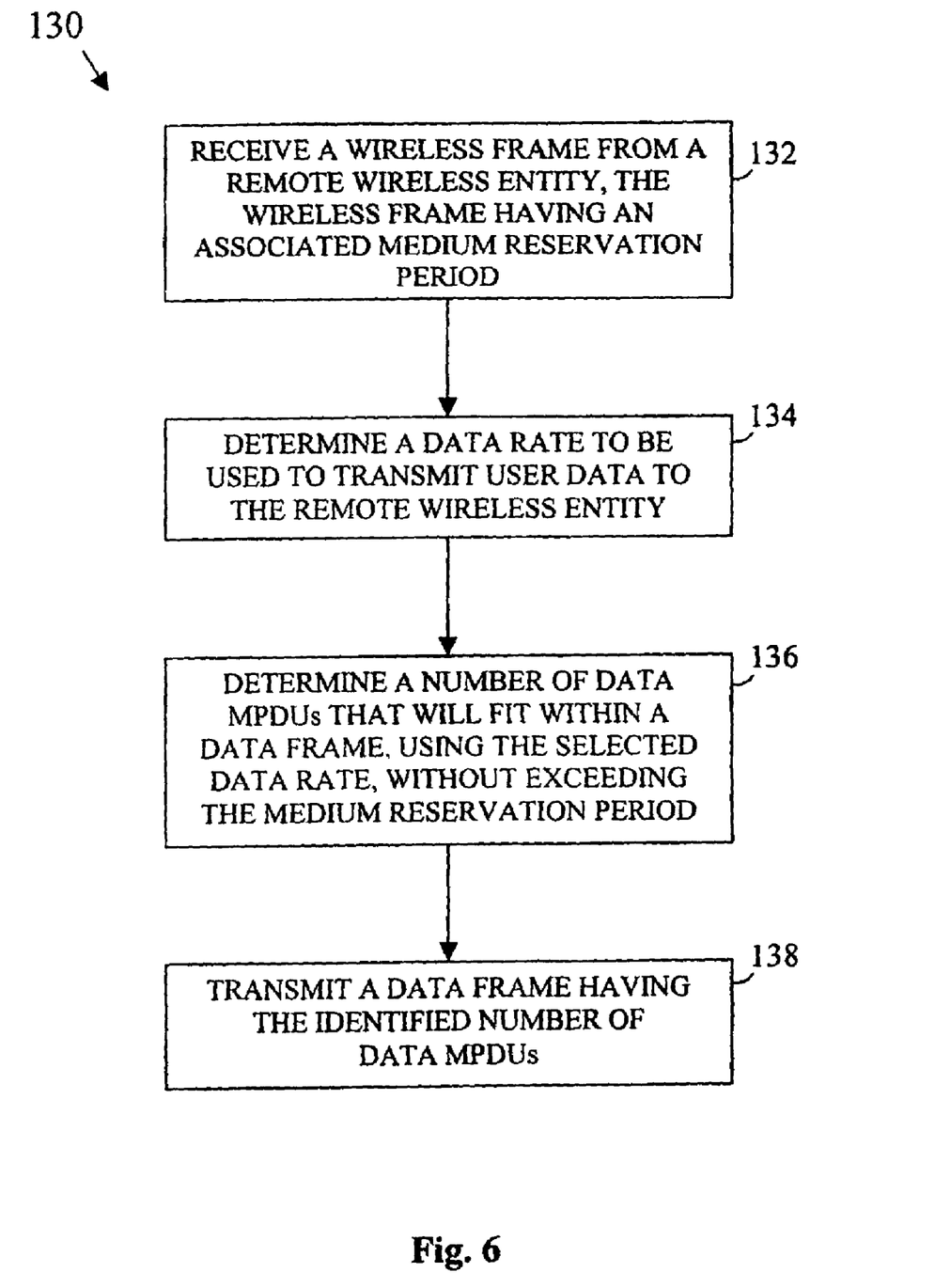
FIG. 6 is a flowchart illustrating an example method for use during a frame exchange in a wireless network implementing short NAV in accordance with another embodiment of the present invention.

FIG. 6 is a flowchart illustrating an example method 130 for use during a frame exchange in a wireless network implementing short NAV in accordance with an embodiment of the present invention. The method 130 may be used to transmit multiple data MPDUs from a wireless device to a remote wireless entity. In at least one embodiment of the invention, the method 130 may be implemented within a baseband processing portion of a wireless network device (e.g., baseband processing subsystem 18 of wireless device 12 in FIG. 1). A wireless frame is first received from the remote wireless entity (block 132). The wireless frame may be, for example, second frame 82 illustrated in FIG. 4. The wireless frame may include a suggested data rate (or MCS) to be used to transmit data to the remote wireless entity in a subsequent transmission. The wireless frame may also have a medium reservation period associated with it (e.g., a short NAV or spoofed PLCP length) within which the subsequent transmission to the remote wireless entity is to take place. An actual data rate is then determined that will be used to transmit user data within the subsequent transmission to the remote wireless entity (block 134). The actual data rate may be different from the suggested data rate identified within the wireless frame. The number of data MPDUs that will fit within the subsequent data frame, using the selected data rate, without exceeding the medium reservation period is then determined (block 136). In one approach, an integer number of MPDUs will be determined. In another approach, a non-integer number of MPDUs is determined (i.e., one or more of the MPDUs may be fragmented). A data frame is then transmitted that has the identified number of MPDUs aggregated therein (block 138). Any remaining data may then be transmitted within one or more subsequent data frames. In a system that allows reverse direction data flow, a similar technique may be used in the reverse direction.

The techniques and structures of the present invention may be implemented in any of a variety of different forms. For example, features of the invention may be embodied within cellular telephones and other handheld wireless communicators; personal digital assistants having wireless capability; laptop, palmtop, desktop, and tablet computers having wireless capability; pagers; satellite communicators; cameras having wireless capability; audio/video devices having wireless capability; wireless network interface cards (NICs) and other network interface structures; wireless access points and base stations; integrated circuits; as instructions and/or data structures stored on machine readable media; and/or in other formats. Examples of different types of machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In at least one form, the invention is embodied as a set of instructions that are modulated onto a carrier wave for transmission over a transmission medium.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for use during a wireless frame exchange in a wireless network, comprising:
receiving a first wireless frame from a remote network device, said first wireless frame carrying a medium reservation period indication to reserve a network medium for a subsequent transmission of a single data MAC protocol data unit (MPDU) to said remote network device, said medium reservation period indication having been generated based on a suggested data rate developed by said remote network device for said subsequent transmission of said single data MPDU, wherein said first wireless frame also includes an indication of said suggested data rate;
determining an actual data rate to use to transmit user data to said remote network device during said subsequent transmission;
when said actual data rate is different from said suggested data rate and does not allow all of said single data MPDU to be transmitted within a medium reservation period defined by said medium reservation period indication, fragmenting said single data MPDU to identify a first fragment that can be transmitted in a data frame within said medium reservation period;
transmitting said first fragment to said remote network device within a subsequent data frame;
receiving an acknowledgement (ACK) frame from said remote network device after transmitting said subsequent data frame;
transmitting another fragment of said single data MPDU to said remote network device in a data frame after receiving said ACK frame; and
switching from a short network allocation vector (NAV) technique to a long NAV technique in response to receipt of said ACK frame, wherein said short NAV technique uses a medium reservation indication that reserves the network medium until an end of a subsequent frame transmission and said long NAV technique uses a network medium reservation indication that reserves the network medium until an end of a corresponding frame exchange sequence.

2. The method of claim 1, wherein:
said medium reservation period indication within said first wireless frame is defined using physical layer spoofing techniques.

3. The method of claim 1, wherein:
said subsequent data frame includes a length field to indicate an amount of data that is to be transmitted to said remote network device in a data frame after said subsequent data frame.

4. The method of claim 1, wherein:
determining an actual data rate to use to transmit user data to said remote network device includes determining said actual data rate using channel information received from said remote network device and power amplifier power back off information for a local transmitter.

5. The method of claim 1, wherein:
determining an actual data rate includes selecting one of a plurality of modulation coding schemes, each modulation coding scheme having a corresponding data rate.

6. The method of claim 1, further comprising:
transmitting an initiation frame to said remote network device before receiving said first wireless frame from said remote network device, said initiation frame including a length field to indicate an amount of data that is desired to be transmitted to said remote network device in a subsequent transmission, wherein said remote network device transmits said first wireless frame in response to said initiation frame.

7. An apparatus comprising:
a wireless transceiver to support wireless communication with one or more remote wireless entities; and
a baseband processing subsystem, coupled to said wireless transceiver, to perform baseband processing and control functions, wherein said baseband processing subsystem is operative to (a) receive a first frame from a remote network device during a wireless frame exchange, said first frame carrying a medium reservation period indication to reserve a network medium for a subsequent transmission of a single data MAC protocol data unit (MPDU) to said remote network device, said medium reservation period indication having been generated based on a suggested data rate developed by said remote network device for said subsequent transmission of said single data MPDU, wherein said first frame also includes an indication of said suggested data rate, (b) determine an actual data rate to use to transmit user data to said remote network device, (c) when said actual data rate is different from said suggested data rate and does not allow all of said single data MPDU to be transmitted in a subsequent frame within a medium reservation period defined by said medium reservation period indication, fragment said single data MPDU to achieve a first fragment that can be transmitted in a subsequent frame within said medium reservation period, (d) cause said first fragment to be transmitted to said remote network device within a subsequent data frame, (e) receive an acknowledgement (ACK) frame from said remote network device after said subsequent data frame is transmitted, and (f) cause a second fragment of said single data MPDU to be transmitted to said remote network device within another data frame after an end of said ACK frame;

wherein said baseband processing subsystem is to switch from a short network allocation vector (NAV) technique to a long NAV technique after receipt of said ACK frame, wherein said short NAV technique uses a medium reservation indication that reserves the network medium until an end of a subsequent frame transmission and said lone NAV technique uses a network medium reservation indication that reserves the network medium until an end of a corresponding frame exchange sequence.

8. The apparatus of claim 7, wherein:
said baseband processing subsystem determines said actual data rate using channel information received from said remote network device and power amplifier power back off information for a transmitter within said wireless transceiver.

9. The apparatus of claim 7, wherein:
said actual data rate does not allow an entire MPDU to be transmitted within the medium reservation period when said actual data rate is less than said suggested data rate.

10. A method for use during a wireless frame exchange in a wireless network, comprising:
receiving a first wireless frame from a remote network device, said first wireless frame carrying a medium reservation period indication to reserve a network medium for a subsequent transmission to said remote network device, said medium reservation period indication having been generated based on a suggested data rate developed by said remote network device for said subsequent transmission;
determining an actual data rate to use to transmit user data to said remote network device during said subsequent transmission;
when said actual data rate does not allow an entire data MAC protocol data unit (MPDU) to be transmitted in a data frame within a medium reservation period defined by said medium reservation period indication, fragmenting said data MPDU to identify a first fragment that can be transmitted in a data frame within said medium reservation period;
transmitting said first fragment to said remote network device within a subsequent data frame;
receiving an acknowledgement (ACK) frame from said remote network device after transmitting said subsequent data frame;
transmitting another fragment of said data MPDU to said remote network device in a data frame after receiving said ACK frame; and
switching from a short network allocation vector (NAV) technique to a long NAV technique in response to receipt of said ACK frame, wherein said short NAV technique uses a medium reservation indication that reserves the network medium until an end of a subsequent frame transmission and said long NAV technique uses a network medium reservation indication that reserves the network medium until an end of a corresponding frame exchange sequence.

11. The method of claim 10, wherein:
said medium reservation period indication within said first wireless frame is defined using physical layer spoofing techniques.

12. The method of claim 10, wherein:
said subsequent data frame includes a length field to indicate an amount of data that is to be transmitted to said remote network device in a data frame after said subsequent data frame.

13. The method of claim 10, wherein:
determining an actual data rate to use to transmit user data to said remote network device includes determining said actual data rate using channel information received from said remote network device and power amplifier power back off information for a local transmitter.

14. The method of claim 10, wherein:
determining an actual data rate includes selecting one of a plurality of modulation coding schemes, each modulation coding scheme having a corresponding data rate.

15. The method of claim 10, further comprising:
transmitting an initiation frame to said remote network device before receiving said first wireless frame from said remote network device, said initiation frame including a length field to indicate an amount of data that is desired to be transmitted to said remote network device in a subsequent transmission, wherein said remote network device transmits said first wireless frame in response to said initiation frame.

16. An apparatus comprising:
a wireless transceiver to support wireless communication with one or more remote wireless entities; and
a baseband processing subsystem, coupled to said wireless transceiver, to perform baseband processing and control functions, wherein said baseband processing subsystem is operative to: (a) receive a first frame from a remote network device during a wireless frame exchange, said first frame carrying a medium reservation period indication to reserve a network medium for a subsequent transmission to said remote network device, said medium reservation period indication having been generated based on a suggested data rate developed by said remote network device for said subsequent transmission, (b) determine an actual data rate to use to transmit user data to said remote network device, (c) when said actual data rate does not allow an entire MAC protocol data unit (MPDU) to be transmitted in a subsequent frame within a medium reservation period defined by said medium reservation period indication, fragment said data MPDU to achieve a first fragment that can be transmitted in a subsequent frame within said medium reservation period; (d) cause said first fragment to be transmitted to said remote network device within a subsequent data frame, (e) receive an acknowledgement (ACK) frame from said remote network device after said subsequent data frame is transmitted, and (f) cause a second fragment of said data MPDU to be transmitted to said remote network device within another data frame after an end of said ACK frame;

wherein said baseband processing subsystem is to switch from a short network allocation vector (NAV) technique to a long NAV technique after receipt of said ACK frame, wherein said short NAV technique uses a medium reservation indication that reserves the network medium until an end of a subsequent frame transmission and said long NAV technique uses a network medium reservation indication that reserves the network medium until an end of a corresponding frame exchange sequence.

17. The apparatus of claim 16, wherein:

said baseband processing subsystem determines said actual data rate using channel information received from said remote network device and power amplifier power back off information for a transmitter within said wireless transceiver.

18. The apparatus of claim 16, wherein:

said actual data rate does not allow an entire MPDU to be transmitted within the medium reservation period when said actual data rate is less than said suggested data rate.

* * * * *